(No Model.)
S. BERGMANN.
ELECTRIC CABLE CONNECTOR.
No. 445,365. Patented Jan. 27, 1891.
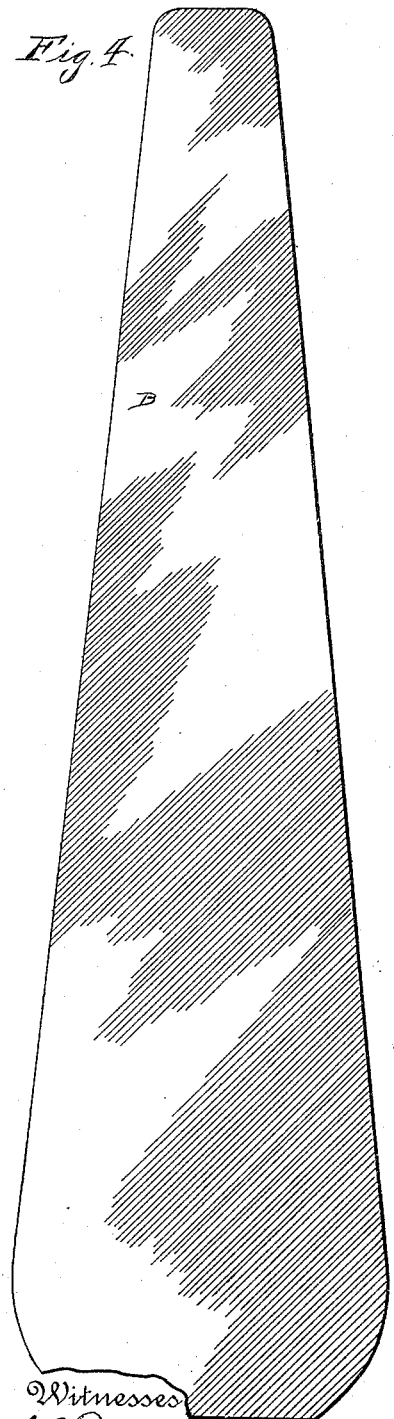
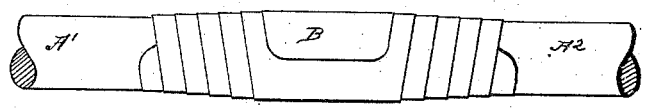
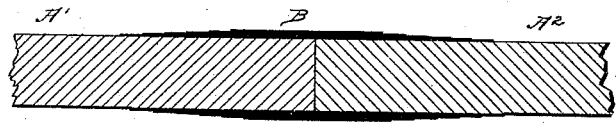
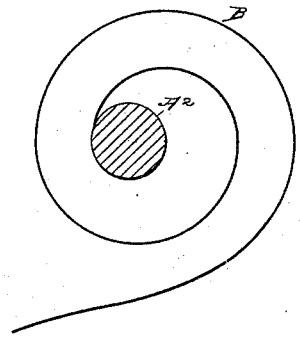
Inventor
Sigmund Bergmann
By his Attorney

UNITED STATES PATENT OFFICE.

SIGMUND BERGMANN, OF NEW YORK, N. Y.

ELECTRIC-CABLE CONNECTOR.

SPECIFICATION forming part of Letters Patent No. 445,365, dated January 27, 1891.

Application filed July 24, 1890. Serial No. 359,770. (No model.)

*To all whom it may concern:*

Be it known that I, SIGMUND BERGMANN, of New York, in the county and State of New York, have invented a certain new and useful Improvement in Means for Uniting Sections of Electric Cables or Conductors, of which the following is a specification.

The object of my improvement is to provide a simple and effective means for uniting sections of electric cables or conductors abutting end against end.

The improvement consists in placing the sections of electric cables or conductors end to end, in taking a longitudinally-tapering strip of metal, and after placing the wider end thereof against the end portions of the sections of electric cables or conductors winding the strip around the same, said strip being united to the sections and having its coils also fastened together by solder or otherwise, as may be desired. In this way I provide a joint which around the abutting ends of the electric cables or conductors will be composed of such number of layers as to afford great strength and sufficient conductivity, and which will be gradually reduced in each direction away from the ends of the section, so as not to make or form a projection thereon that will interfere with the drawing of the cables through pipes or tubes, or in case of street-railways with the passage of the trolley.

In the accompanying drawings, Figure 1 shows a cable-section and an edge view of a strip made in accordance with my improvement, placed with the wider end against the same preparatory to winding. Fig. 2 is a side view of two cable-sections with the strip fully wound upon them. Fig. 3 is a longitudinal section of the cable-sections and the strip wound upon the same. Fig. 4 is a face view of the strip extended.

Similar letters of reference designate corresponding parts in all the figures.

$A'$ $A^2$ designate two sections of conductors placed in line, with their adjacent ends abutting.

B designates a strip, which may advantageously be made of sheet-copper, and which tapers from one end to the other. When made of copper it will be tinned, so that it may be soldered. The wide end of the strip B is placed across the joint formed by abutting the ends of the sections, as may be readily understood by reference to Fig. 1. It will preferably be tacked to the sections by solder. The strip will be wound around the abutting ends of the sections and its different coils or convolutions soldered or brazed together and to the sections. It will be seen that by this means I provide an envelope which is very thick and strong immediately around the abutting ends of the sections, affording ample conductivity, and yet, owing to the tapered form of the strip, tapers gradually away from the ends of the sections because each coil or convolution of the strip will be narrower than the one inward of it.

What I claim as my invention, and desire to secure by Letters Patent, is—

The combination, with electric cable or conductor sections abutted end to end, of a longitudinally-tapering strip wound around the end portions of the sections, with its wider end innermost and fastened in place thereon, substantially as specified.

In testimony whereof I have signed my name to this specification in the presence of two subscribing witnesses.

SIGMUND BERGMANN.

Witnesses:
ORLANDO C. J. SCHARFF,
THOMAS MURRAY.